US008243246B2

(12) United States Patent
Wang et al.

(10) Patent No.: US 8,243,246 B2
(45) Date of Patent: Aug. 14, 2012

(54) LIQUID CRYSTAL DISPLAY HAVING PARTICULAR CONDUCTIVE ELEMENT

(75) Inventors: Wen-Chun Wang, Taichung (TW); Chin-Chang Liu, Taichung County (TW)

(73) Assignee: Wintek Corporation, Taichung (TW)

( * ) Notice: Subject to any disclaimer, the term of this patent is extended or adjusted under 35 U.S.C. 154(b) by 571 days.

(21) Appl. No.: 12/540,057

(22) Filed: Aug. 12, 2009

(65) Prior Publication Data

US 2010/0039592 A1    Feb. 18, 2010

(30) Foreign Application Priority Data

Aug. 13, 2008  (TW) ............................... 97130753 A
Apr. 20, 2009  (TW) ............................... 98113080 A

(51) Int. Cl.
*G02F 1/1339*    (2006.01)
*G02F 1/1343*    (2006.01)
*G02F 1/1333*    (2006.01)

(52) U.S. Cl. ...................... 349/155; 349/141; 349/158

(58) Field of Classification Search .................. 349/155, 349/141, 158
See application file for complete search history.

(56) References Cited

U.S. PATENT DOCUMENTS

| 6,319,760 | B1 * | 11/2001 | Lee et al. | 438/161 |
| 6,362,032 | B1 | 3/2002 | Kim et al. | |
| 6,449,026 | B1 * | 9/2002 | Min et al. | 349/141 |
| 6,573,969 | B1 * | 6/2003 | Watanabe et al. | 349/155 |

* cited by examiner

*Primary Examiner* — Mike Qi
(74) *Attorney, Agent, or Firm* — Muncy, Geissler, Olds & Lowe, PLLC

(57) ABSTRACT

A liquid crystal display includes a color filter substrate, an array substrate, a liquid crystal layer, and at least one conductive element. The color filter substrate has at least one color filter, at least one first electrode, and at least one second electrode opposite the first electrode. The second electrode is comb-shaped and disposed between the first electrode and the liquid crystal layer, and one of the first and the second electrodes is electrically connected to a common voltage of the liquid crystal display. At least one conductive element electrically connects the source/drain region of a thin film transistor with the other one of the first and the second electrodes which is not connected to the common voltage.

19 Claims, 4 Drawing Sheets

LIQUID CRYSTAL DISPLAY HAVING PARTICULAR CONDUCTIVE ELEMENT

CROSS REFERENCE TO RELATED APPLICATION

This application claims priority of application No. 097130753 filed on Aug. 13, 2008 and application No. 098113080 filed on Apr. 20, 2009 in Taiwan R.O.C under 35 U.S.C. §119; the entire contents of which are hereby incorporated by reference.

BACKGROUND OF THE INVENTION

1. Field of the Invention

The invention relates to a liquid crystal display having a high aperture ratio.

2. Description of the Related Art

FIG. 1 shows a schematic diagram of an array substrate 100 of a conventional liquid crystal display. Referring to FIG. 1, a common electrode (counter electrode) 104 is formed on a bottom transparent substrate 102, a gate insulation layer 106 and a passivation layer 108 are deposited on the common electrode 104 in succession, and a comb-shaped pixel electrode 112 is formed on the passivation layer 108. According to the design shown in FIG. 1, the common electrode 104 is allowed to cooperate with the comb-shaped pixel electrode 112 to produce fringe fields. However, since the common electrode 104 and the comb-shaped pixel electrode 112 are both formed on the array substrate 100, a gap d between an active display area (on which the comb-shaped pixel electrode 112 spreads) and driving circuitry components (such as a TFT 110 and signal transmission lines) must be provided to avoid signal interference like capacitive coupling effect. The occupied area of the gap d considerably decreases the aperture ratio of a pixel.

BRIEF SUMMARY OF THE INVENTION

The invention provides a liquid crystal display having a high aperture ratio.

According to an embodiment of the invention, a liquid crystal display includes a color filter substrate, an array substrate, a liquid crystal layer, and at least one conductive element. The color filter substrate has at least one color filter, at least one first electrode, and at least one second electrode opposite the first electrode. The array substrate has a plurality of scan lines and data lines intersected with each other and at least one thin film transistor electrically connected with the scan lines and the data lines. The second electrode is comb-shaped and disposed between the first electrode and the liquid crystal layer, and one of the first and the second electrodes is electrically connected to a common voltage of the liquid crystal display. At least one conductive element electrically connects the source/drain region of the thin film transistor with the other one of the first and the second electrodes which is not connected to the common voltage.

In one embodiment, the conductive element is a conductive bump made of electrically conductive materials or an insulating bump coated with electrically conductive films.

In one embodiment, the conductive element is a conductive spacer.

According to the above embodiments, fringes fields are produced between the pixel electrode and the common electrode (at least one of them is comb-shaped) to twist horizontally-aligned liquid crystal molecules between two transparent substrates to effect a display. Since the comb-shaped pixel electrode or comb-shaped common electrode for inducing fringe fields is formed on the color filter substrate rather than the array substrate, the gap formerly provided between an active display area and driving circuitry components such as TFTs, data lines and scan lines is no longer needed. Hence, the active display area is allowed to extend to a great extent to considerably improve the aperture ratio of a pixel.

Other objectives, features and advantages of the present invention will be further understood from the further technological features disclosed by the embodiments of the present invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and variations thereof herein are used broadly and encompass direct and indirect connections, couplings, and mountings. Similarly, "adjacent to" and variations thereof herein are used broadly and encompass directly and indirectly "adjacent to". Therefore, the description of "A" component "adjacent to" "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
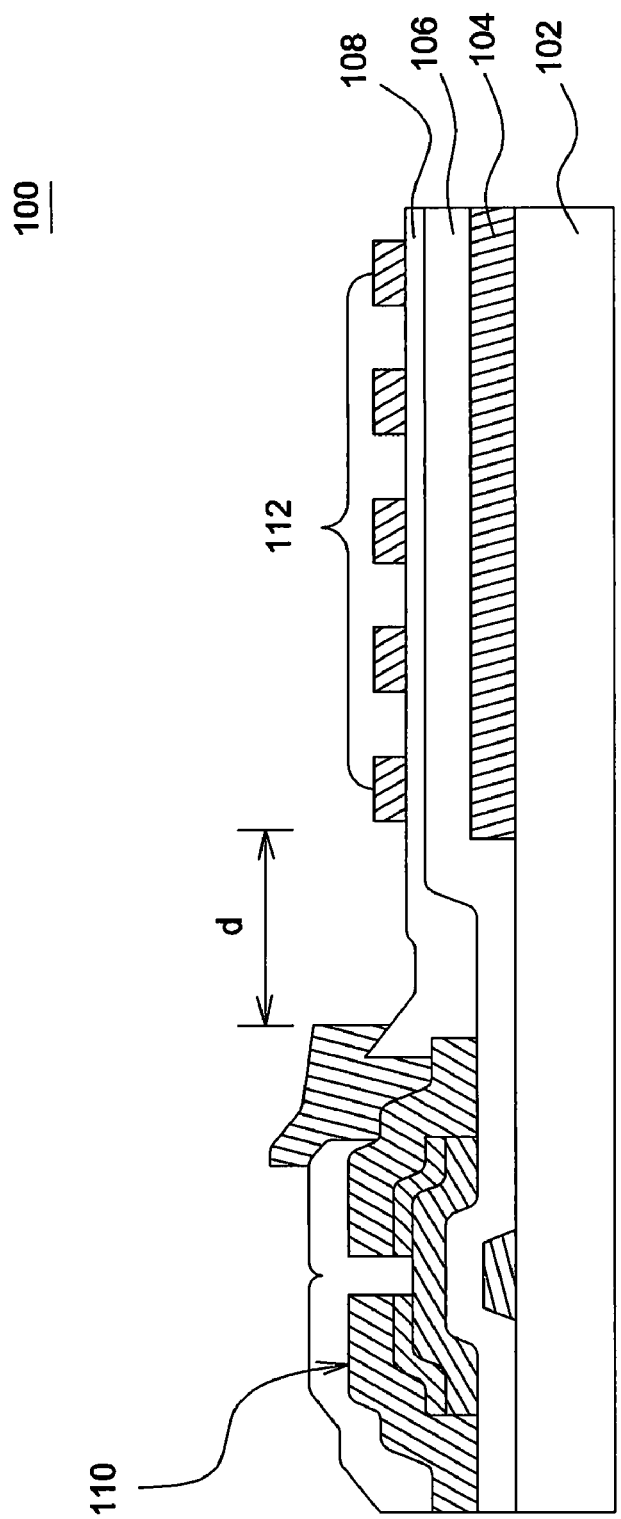
FIG. 1 shows a schematic diagram of an array substrate of a conventional liquid crystal display.
Figure 2:
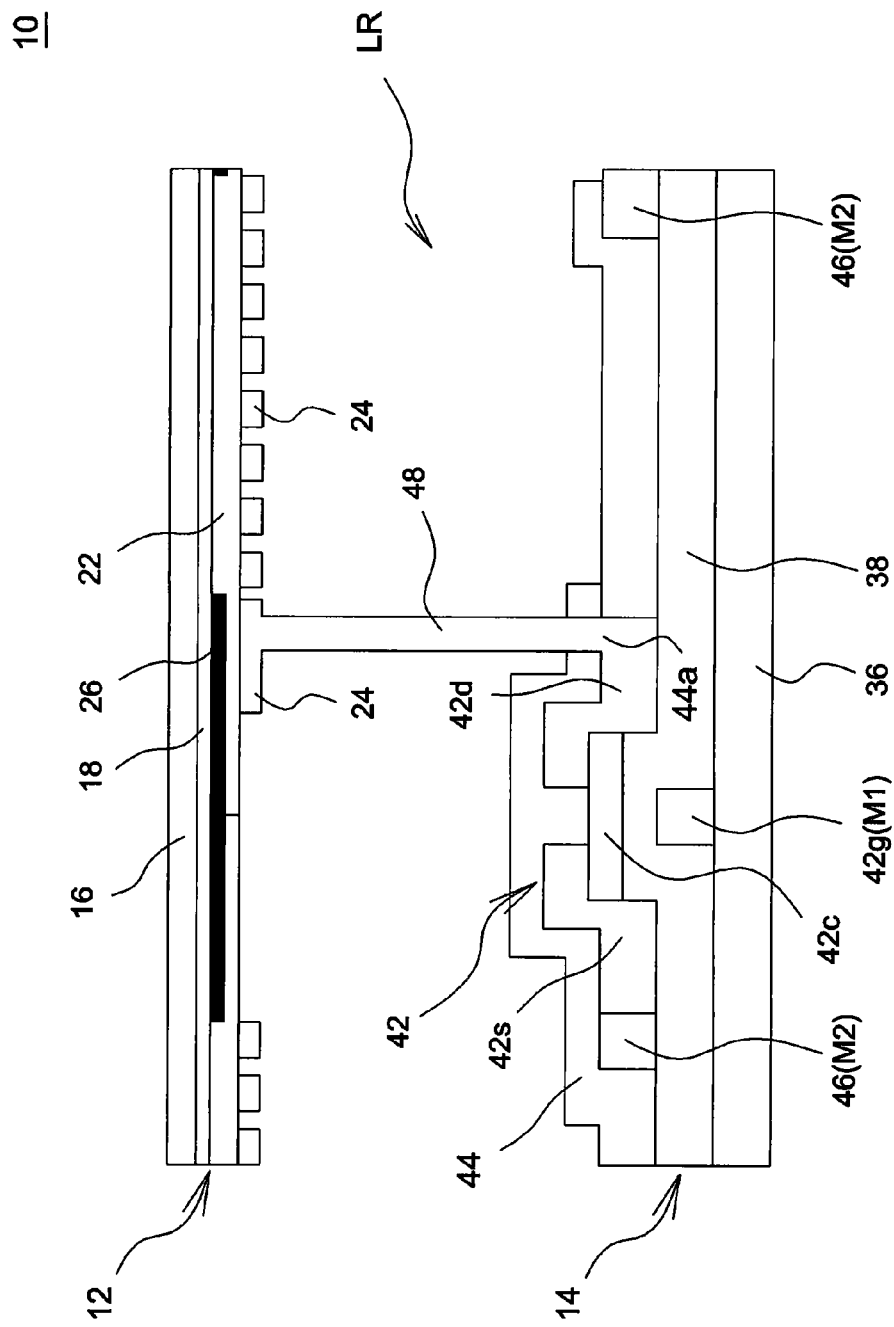
FIG. 2 shows a schematic diagram of a liquid crystal display according to an embodiment of the invention.

FIG. 2 shows a schematic diagram of a liquid crystal display (LCD) 10 according to an embodiment of the invention. Referring to FIG. 2, the LCD 10 includes a color filter substrate 12, an array substrate 14, and a liquid crystal layer LR interposed between the color filter substrate 12 and the array substrate 14. In the color filter substrate 12, a common electrode 18 is formed on a transparent substrate 16. In this embodiment, the common electrode 18 spreads over an entire surface of the transparent substrate 16. However, the common electrode 18 is not limited to be surface-shaped, and it may also be comb-shaped. The common electrode 18 may be formed from transparent metal-oxide conductive films, and at least one color filter 22 is formed on the common electrode 18. At least one comb-shaped pixel electrode 24 is formed on the color filter 22, and the pixel electrode 24 may be formed from transparent metal-oxide conductive films and patterned to have the shape of a comb. Besides, a black matrix 26 is formed between two adjacent color filters 22. In the array substrate 14, multiple scan lines are intersected with multiple data lines, and at least one thin film transistor is formed in the vicinity of each intersection of the scan line and the data line. Certainly, the position of the thin film transistor can be changed according to any design demand. An example of a stack of optical films on the array substrate 14 is described below. In the array substrate, a first metal layer M1 is formed on the transparent substrate 36 and patterned through etching to form scan lines (not shown) and the gate 42g of a thin film transistor (TFT) 42. A dielectric gate insulation layer 38 is formed to cover the first metal layer M1. A channel region 42c made of amorphous silicon and a second metal layer M2 are formed on the gate insulation layer 38. Specifically, the second metal layer M2 is patterned through etching to form the source 42s and the drain 42d of the TFT 42 and data lines 46. A dielectric passivation layer 44 is formed on the gate insulation layer 38 to cover the source 42s and the drain 42d of the TFT 42 and the data lines 46. Further, at least one contact hole 44a is formed on the passivation layer 44 to expose a part of the source/drain region of the TFT 42. Then, a conductive bump 48 electrically connects the comb-shaped pixel electrode 24 on the color filter substrate 12 with the TFT 42 on the array substrate 14 through the contact hole 44a. Thereby, fringes fields are produced between the comb-shaped pixel electrode 24 and the opposite common electrode 18 on the color filter substrate 12 to twist horizontally-aligned liquid crystal molecules between two transparent substrates so as to effect a display.

According to this embodiment, since the comb-shaped pixel electrode 24 for inducing fringe fields is formed on the color filter substrate 12 rather than the array substrate 14, the gap formerly provided between an active display area and driving circuitry components such as TFTs, data lines and scan lines is no longer needed. Hence, the active display area is allowed to extend to a great extent to considerably improve the aperture ratio of a pixel.

Figure 3:
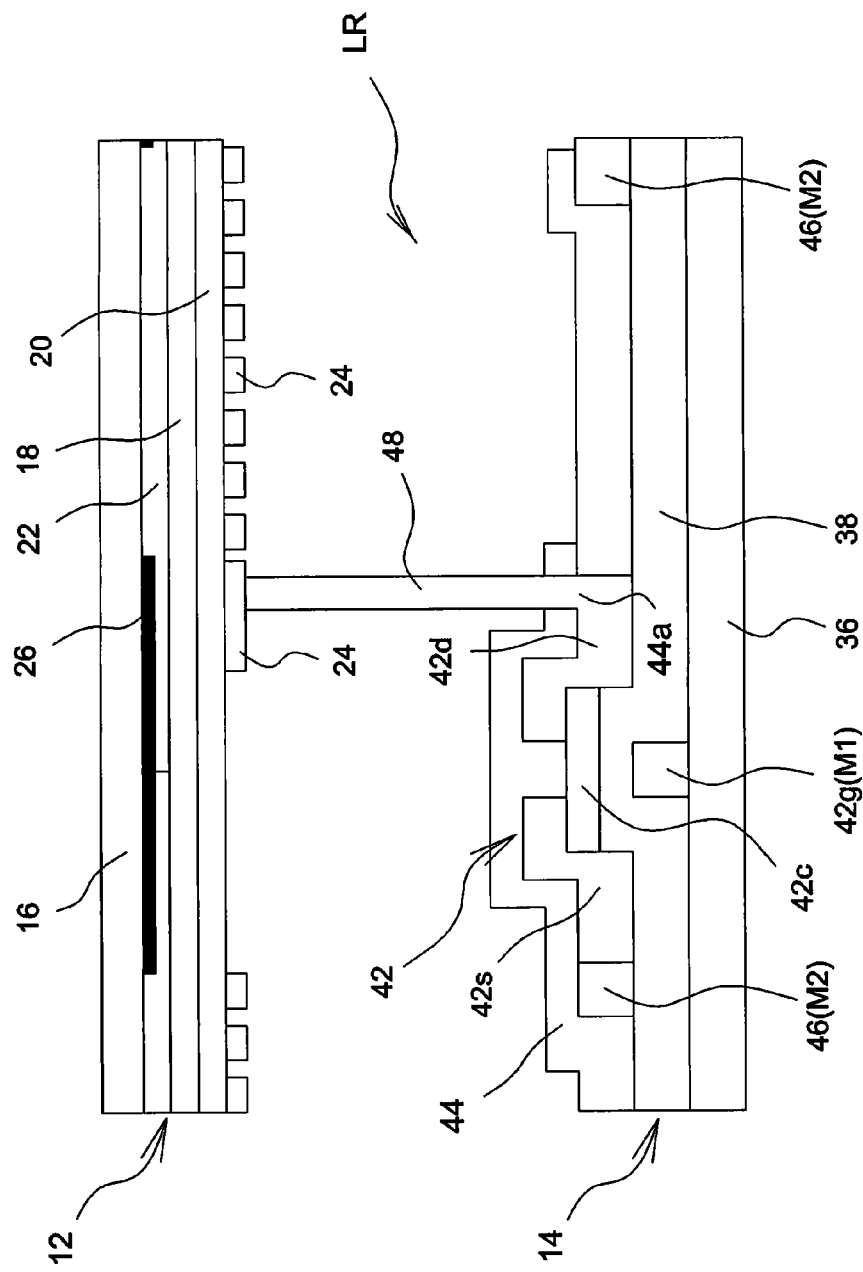
FIG. 3 shows a schematic diagram of a liquid crystal display according to another embodiment of the invention.

FIG. 3 shows a liquid crystal display 50 according to another embodiment of the invention. This embodiment is similar to the embodiment shown in FIG. 2, except this embodiment has a different stack of optical films on the color filter substrate 12. Referring to FIG. 3, in the color filter substrate 12, at least one color filter 22 and black matrix 26 are formed on a transparent substrate 16, and a common electrode 18 spreads over an entire surface of the color filter 22. However, the common electrode 18 is not limited to be surface-shaped, and it may also be comb-shaped. An insulating layer 20 is formed on the common electrode 18, and at least one comb-shaped pixel electrode 24 is formed on the insulating layer 20 to cooperate the common electrode 18 to produce fringe fields. Similarly, a conductive bump 48 electrically connects the comb-shaped pixel electrode 24 on the color filter substrate 12 with the TFT 42 on the array substrate 14 through the contact hole 44a.

Figure 4:
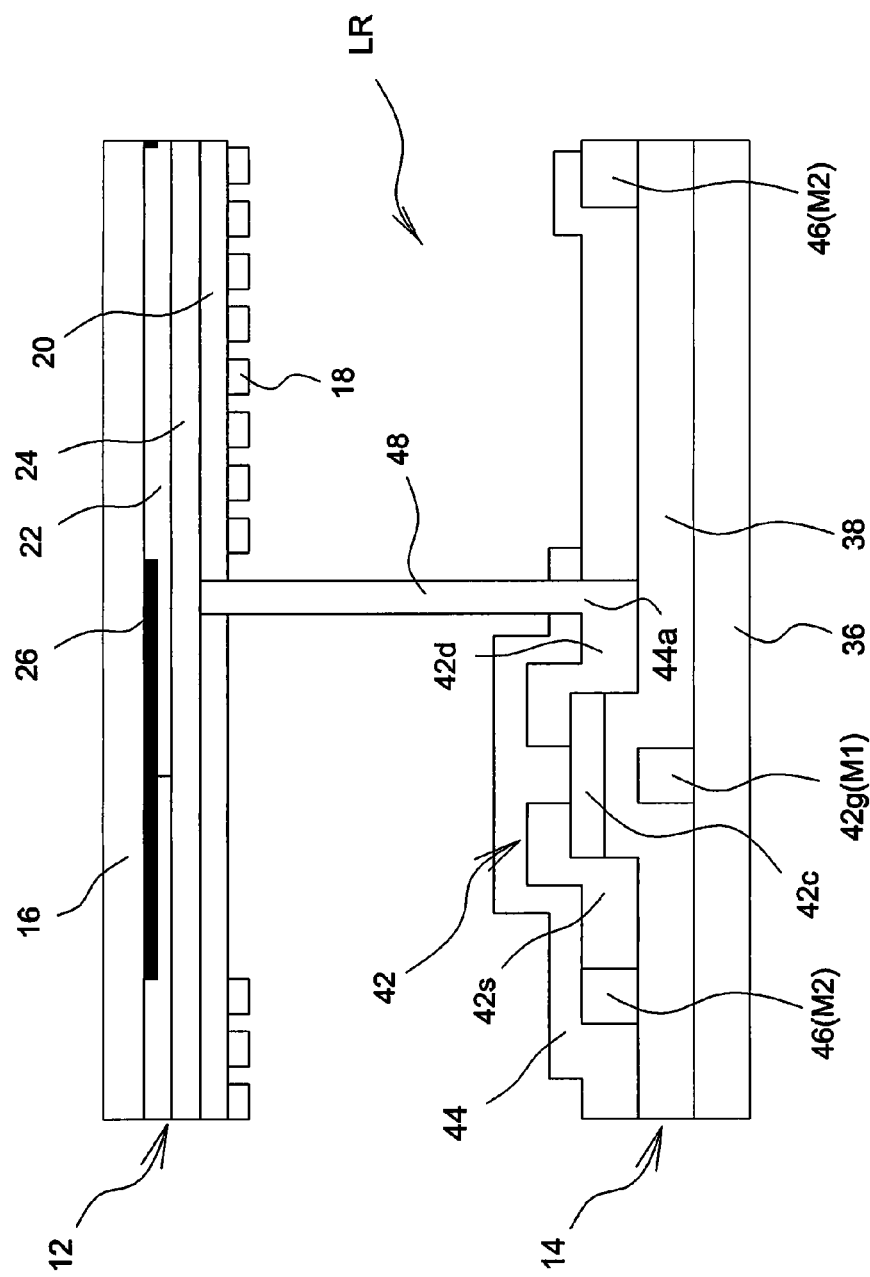
FIG. 4 shows a schematic diagram of a liquid crystal display according to another embodiment of the invention.

FIG. 4 shows a schematic diagram of an LCD 60 according to another embodiment of the invention. Referring to FIG. 4, in the color filter substrate 12, at least one color filter 22 and a black matrix 26 are formed on a transparent substrate 16, and a pixel electrode 24 spreads over an entire surface of the color filter 22. However, the pixel electrode is not limited to be surface-shaped, and it may also be comb-shaped. Also, an insulating layer 20 is formed on the pixel electrode 24, and at least one comb-shaped common electrode 18 is formed on the insulating layer 20 to cooperate with the surface-shaped pixel electrode 24 to produce fringe fields. Similarly, a conductive bump 48 electrically connects the pixel electrode 24 on the color filter substrate 12 with the TFT 42 on the array substrate 14 through the contact hole.

According to the above embodiments, a first electrode and a second electrode are both provided on the color filter substrate 12, the second electrode is disposed between the first electrode and the liquid crystal layer, the second electrode is comb-shaped, and the first electrode is surface-shaped or comb-shaped. One of the first and the second electrodes is connected to a common voltage (Vcom) of the LCD, and the other is connected to the source/drain region of a thin film transistor to produce fringe fields. This configuration is allowed to effectively increase the active display area and the aperture ratio as a result. Note the way of connecting the pixel electrode 24 on the color filter substrate 12 with the source/drain region of the TFT 42 is not limited. Except that the conductive bump 48 made of electrically conductive materials is provided, an insulating bump coated with conductive films may also be used. Alternatively, conductive spacers may be implanted between two substrates to achieve electrical connection.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A liquid crystal display, comprising:
   a color filter substrate having at least one color filter, at least one first electrode, and at least one second electrode opposite the first electrode;
   an array substrate having a plurality of scan lines and data lines intersected with each other and at least one thin film transistor electrically connected with the scan lines and the data lines;
   a liquid crystal layer interposed between the color filter substrate and the array substrate, wherein the second electrode is comb-shaped and disposed between the first electrode and the liquid crystal layer, and one of the first and the second electrodes is electrically connected to a common voltage of the liquid crystal display; and
   at least one conductive element electrically connecting the source/drain region of the thin film transistor with the other one of the first and the second electrodes which is not connected to the common voltage.

2. The liquid crystal display as claimed in claim 1, wherein the first electrode is surface-shaped or comb-shaped.

3. The liquid crystal display as claimed in claim 1, wherein the conductive element is a conductive bump made of electrically conductive materials.

4. The liquid crystal display as claimed in claim 1, wherein the conductive element is an insulating bump coated with electrically conductive films.

5. The liquid crystal display as claimed in claim 1, wherein the conductive element is a conductive spacer.

6. The liquid crystal display as claimed in claim 1, wherein the first and the second electrodes are made of transparent metal-oxide conductive films.

7. A liquid crystal display, comprising:
   a color filter substrate, comprising:
     a first transparent substrate;
     at least one common electrode formed on the first transparent substrate; and
     at least one comb-shaped pixel electrode formed on the first transparent substrate to cooperate with the common electrode to produce fringe fields;
   an array substrate, comprising:
     a second transparent substrate;
     a plurality of scan lines and data lines intersected with each other and formed on the second transparent substrate;
     at least one thin film transistor electrically connected with the scan lines and the data lines; and
     a first insulating layer covering the thin film transistor, the insulating layer having at least one contact hole to expose a part of the source/drain region of the thin film transistor;
   a liquid crystal layer interposed between the color filter substrate and the array substrate; and
   at least one conductive element electrically connecting the comb-shaped pixel electrode with the source/drain region of the thin film transistor through the contact hole.

8. The liquid crystal display as claimed in claim 7, further comprising:
   at least one color filter formed on the common electrode, wherein the comb-shaped pixel electrode is formed on the color filter.

9. The liquid crystal display as claimed in claim 8, wherein the conductive element is a conductive bump made of electrically conductive materials.

10. The liquid crystal display as claimed in claim 8, wherein the conductive element is an insulating bump coated with electrically conductive films.

11. The liquid crystal display as claimed in claim 8, wherein the conductive element is a conductive spacer.

12. The liquid crystal display as claimed in claim 7, further comprising:
    at least one color filter formed on the first transparent substrate, wherein the common electrode is formed on the color filter; and
    a second insulating layer covering the common electrode, wherein the comb-shaped pixel electrode is formed on the second insulating layer.

13. The liquid crystal display as claimed in claim 12, wherein the conductive element is a conductive bump made of electrically conductive materials.

14. The liquid crystal display as claimed in claim 12, wherein the conductive element is an insulating bump coated with electrically conductive films.

15. The liquid crystal display as claimed in claim 12, wherein the conductive element is a conductive spacer.

16. A liquid crystal display, comprising:
    a color filter substrate, comprising:
      a first transparent substrate;
      at least one color filter formed on the first transparent substrate;
      at least one pixel electrode formed on the color filter;
      a first insulating layer covering the pixel electrode; and
      at least one comb-shaped common electrode formed on the first insulating layer to cooperate with the pixel electrode to produce fringe fields;
    an array substrate, comprising:
      a second transparent substrate;
      a plurality of scan lines and data lines intersected with each other and formed on the second transparent substrate;
      at least one thin film transistor electrically connected with the scan lines and the data lines; and
      a second insulating layer covering the thin film transistor, the insulating layer having at least one contact hole to expose a part of the source/drain region of the thin film transistor;
    a liquid crystal layer interposed between the color filter substrate and the array substrate; and
    at least one conductive element electrically connecting the pixel electrode with the source/drain region of the thin film transistor through the contact hole.

17. The liquid crystal display as claimed in claim 16, wherein the conductive element is a conductive bump made of electrically conductive materials.

18. The liquid crystal display as claimed in claim 16, wherein the conductive element is an insulating bump coated with electrically conductive films.

19. The liquid crystal display as claimed in claim 16, wherein the conductive element is a conductive spacer.

* * * * *